H. LATSHAW.
Neck-Yokes.
No. 150,332. Patented April 28, 1874.
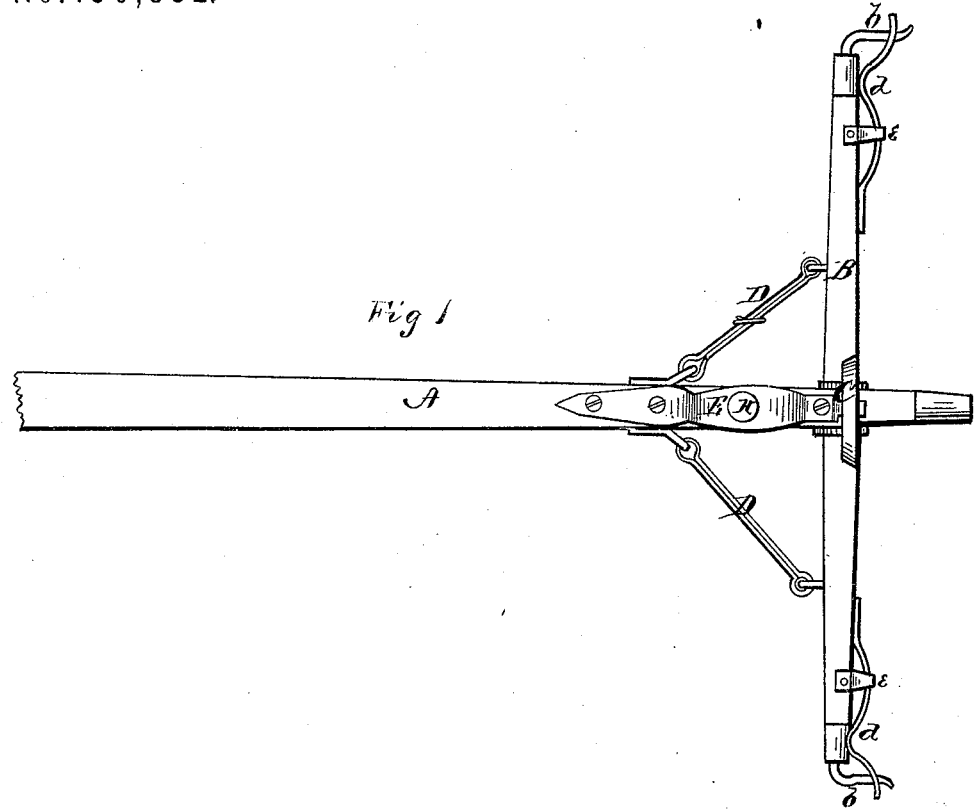
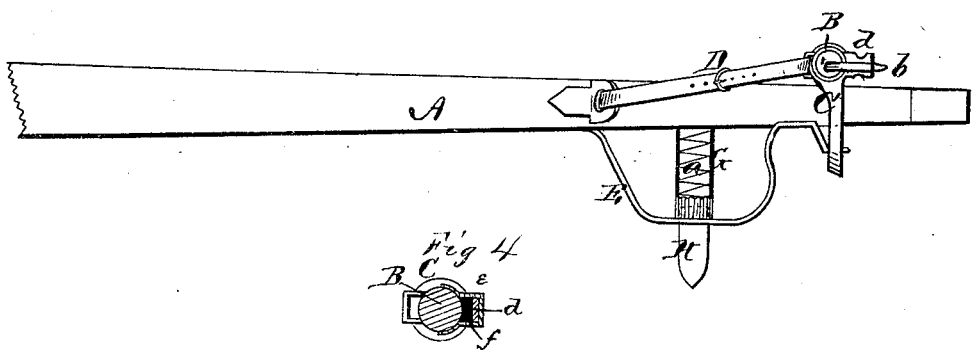
Witnesses:
F. L. Durand
C. L. Evert
Inventor.
Hezekiah Latshaw
per Alexander Mason
Attorneys.

UNITED STATES PATENT OFFICE.

HEZEKIAH LATSHAW, OF McKNIGHTSTOWN, PENNSYLVANIA.

IMPROVEMENT IN NECK-YOKES.

Specification forming part of Letters Patent No. 150,332, dated April 28, 1874; application filed June 24, 1873.

*To all whom it may concern:*

Be it known that I, HEZEKIAH LATSHAW, of McKnightstown, in the county of Adams and in the State of Pennsylvania, have invented certain new and useful Improvements in Neck-Yoke and Attachments; and do hereby declare that the following is a full, clear, and exact description thereof, reference being had to the accompanying drawings, and to the letters of reference marked thereon, making a part of this specification.

The nature of my invention consists, first, in a pole, to which the neck-yoke is attached, having a downward-projecting tube inclosing a spring and piston, held in place by a guard, for the purpose of breaking the jar and preventing the pole and neck-yoke from injury when the same are dropped upon the ground; second, in the construction of a guard attached to the under part of the pole, for connecting with the keeper on the neck-yoke, and perfectly guiding and holding the neck-yoke to the pole; third, in the employment of a hook on each end of the neck-yoke, over which the breast-strap is passed, and is secured by a spring having a perforated end for the passage of the hook, all as more fully hereinafter set forth.

In order to enable others skilled in the art to which my invention appertains to make and use the same, I will now proceed to describe its construction and operation, referring to the annexed drawing, in which—

Figure 1 is a bottom view, and Fig. 2 a side view, of my neck-yoke and pole with attachments. Fig. 3 is a cross-section through the center of the neck-yoke, and Fig. 4 is a cross-section through one end of the same.

A represents the pole of a wagon, and B the neck-yoke, connected by means of the usual leather keeper C. D D represent straps connecting the pole to the neck-yoke a suitable distance from the center on each side, as shown. These straps hold the neck-yoke steady, and prevent its being twisted from side to side, which is often the case, whereby the leather keeper gets broken, torn, or injured. On the under side of the pole A, near the front end, is a guard, E, in which is a vertical tube, G, attached to said guard and to the pole. In this tube is a spiral spring, a, the upper end of which is attached to the tube, and the lower end to a pin, H, passing through the end of the tube. When the pole is let down on the ground, the end of this pin strikes the ground first, and yields to the concussion, thus breaking the force of the fall of the pole, and saving the same from injury. The front end of the guard E is bent downward and forward, and then passed through the lower end of the leather keeper C, to keep the same in place on the pole. In the ends of the neck-yoke B are inserted hooks b b, which are bent so as to point forward, and upon these hooks the breast-straps are attached, and they are held by means of springs d d. The inner end of each spring is secured to the front side of the neck-yoke, and its outer end provided with a hole, through which the point of the hook b passes. The spring d passes through a staple, e, in which, between the spring and the neck-yoke, is placed a piece, f, of rubber or other suitable elastic material.

The end of the spring d is readily removed from the hook b for the purpose of attaching the breast-strap; and when it is desired to remove the breast-strap, this can readily be done by merely pulling the same forward.

Having thus fully described my invention, what I claim as new, and desire to secure by Letters Patent, is—

1. The combination of the pole A, guard E, tube G, spring a, and pin H, substantially as and for the purposes set forth.

2. The combination of the pole A and keeper C with the guard E, having its front end extended through the keeper, substantially as and for the purposes set forth.

3. The hooks b, springs d, and staples e, in combination with the neck-yoke C, for the purposes herein set forth.

In testimony that I claim the foregoing I have hereunto set my hand this 3d day of June, 1873.

HEZ. LATSHAW.

Witnesses:
 A. N. MARR,
 C. L. EVERT.